(12) United States Patent
Kothari et al.

(10) Patent No.: US 11,426,943 B2
(45) Date of Patent: Aug. 30, 2022

(54) SELECTION OF POWDER CONTROL TEMPERATURE REGIONS IN 3D PRINTING

(71) Applicant: Hewlett-Packard Development Company, L.P., Spring, TX (US)

(72) Inventors: Sunil Kothari, Palo Alto, CA (US); Tod Heiles, Vancouver, WA (US); Juan Carlos Salazar, Mexico City (MX); Goffril Obegi, Vancouver, WA (US); Jun Zeng, Palo Alto, CA (US); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 266 days.

(21) Appl. No.: 16/472,929

(22) PCT Filed: Apr. 19, 2017

(86) PCT No.: PCT/US2017/028404
§ 371 (c)(1),
(2) Date: Jun. 24, 2019

(87) PCT Pub. No.: WO2018/194591
PCT Pub. Date: Oct. 25, 2018

(65) Prior Publication Data
US 2021/0291456 A1    Sep. 23, 2021

(51) Int. Cl.
*B29C 64/393* (2017.01)
*B29C 64/165* (2017.01)
(Continued)

(52) U.S. Cl.
CPC .......... *B29C 64/393* (2017.08); *B29C 64/165* (2017.08); *B29C 64/295* (2017.08);
(Continued)

(58) Field of Classification Search
CPC ... B29C 64/393; B29C 64/295; B29C 64/165; B33Y 50/02
See application file for complete search history.

(56) References Cited

U.S. PATENT DOCUMENTS 6,815,636 B2    11/2004    Chung et al.
9,522,426 B2    12/2016    Das et al.
(Continued)

FOREIGN PATENT DOCUMENTS

CN    106903315 A    6/2017
RU    2008115450 A    10/2009
(Continued)

OTHER PUBLICATIONS

Improving Additive Manufacturing (3d Printing) Using Infrared Imaging, Aug. 10, 2016 < http://www.azom.com/article.aspx?ArticleID=12976 >.
(Continued)

*Primary Examiner* — Yunju Kim
(74) *Attorney, Agent, or Firm* — Rahman LLC (57) ABSTRACT

A control and feedback technique to determine the proper location of powder control temperature regions includes detecting solid parts having specified shape and thermal characteristics. The solid parts are generated by a 3D printer. The solid parts include powder material fused on a layer by layer basis. A powder control temperature region is selected in each layer of powder material, wherein the region is located in unfused powder material adjacent to the solid parts, and wherein the region is selected based on characteristics of the shape of a build area and thermal imaging associated with any of a structural formation of the solid parts adjacent to the region, and an amount of thermal energy radiated by the solid parts adjacent to the region. The amount of thermal energy to cause fusing of the powder (Continued)

material on each subsequent layer is modified based on location of the powder control temperature region.

20 Claims, 9 Drawing Sheets

(51) Int. Cl.
    *B29C 64/295* (2017.01)
    *B33Y 10/00* (2015.01)
    *B33Y 30/00* (2015.01)
    *B33Y 50/02* (2015.01)

(52) U.S. Cl.
    CPC ............... *B33Y 10/00* (2014.12); *B33Y 30/00* (2014.12); *B33Y 50/02* (2014.12)

(56) References Cited

U.S. PATENT DOCUMENTS

| 2014/0163717 | A1 | 6/2014 | Das et al. |
| 2015/0251353 | A1 | 9/2015 | Rodgers et al. |
| 2015/0266238 | A1* | 9/2015 | Ederer .................. B29C 64/364 264/460 |

FOREIGN PATENT DOCUMENTS

| WO | WO-16119889 | 8/2016 |
| WO | WO-2016119885 | 8/2016 |

OTHER PUBLICATIONS

Wegner, A. et al, "Process monitoring in laser sintering using thermal imaging." In SFF Symposium, Austin, Texas, USA, pp. 8-10. 2011.

* cited by examiner

SELECTION OF POWDER CONTROL TEMPERATURE REGIONS IN 3D PRINTING

BACKGROUND

An important consideration in a three-dimensional (3D) printing process is part yield, which considers the percentage of end parts meeting a mechanical strength requirement, among other criteria. During the 3D printing process, improper temperature control of the powder bed can lead to defects in the resulting part structure, underutilization of available powder material, overfusing of parts, thermal bleeding of parts, and can otherwise decrease the overall part yield resulting in increased manufacturing costs.

DETAILED DESCRIPTION

The examples described herein provide an automated, dynamic method and system that improves the thermal control to increase part yield from 3D printers by performing real time automated detection of parts with certain characteristics such as a significant area-to-perimeter ratio and resolvable features from thermal image detection. Regions are detected that should be the focus for powder control temperature based on maximal distances from regions of high/low thermal content. These regions are defined dynamically based on the current thermal profile rather than using a statically defined and unchanging area for the powder control temperature region. The examples described herein expand the usable build volume and provide a technique to calibrate the warming lamp in real time and based on constant feedback in the printing process. In addition, in certain parts that are likely to overfuse, the examples describe herein provide techniques to determine the additional amount of fusing/detailing agents needed to prevent overfusing. As used herein, "build" refers to a 3D structure created from a 3D printing process, and may contain any number of sub-components, or parts, made from fused powder material, whereby the fused parts create the "build". Moreover, as used herein, "characteristic part" refers to a part that has certain predetermined physical and/or shape characteristics that are identified as being parts that are likely to overfuse and cause thermal bleed due to the heat build-up. The powder control temperature regions will be farthest from these parts but within the constraints imposed by the physical bed and/or operator specified regions.

Figure 1A:
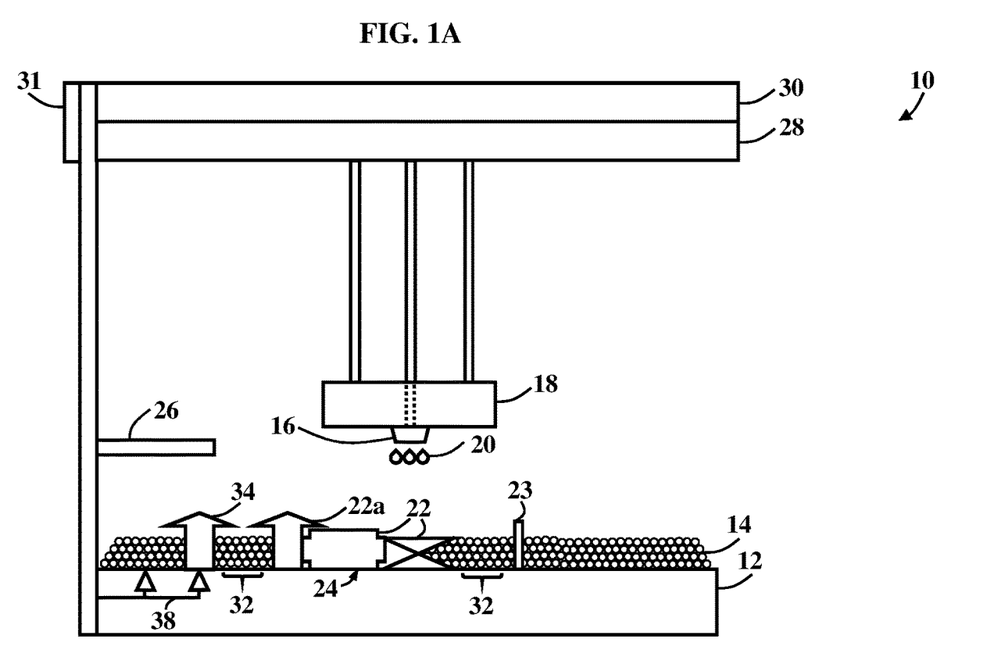
FIG. 1A is a schematic side view diagram of a 3D printer, according to an example herein.
Figure 1B:
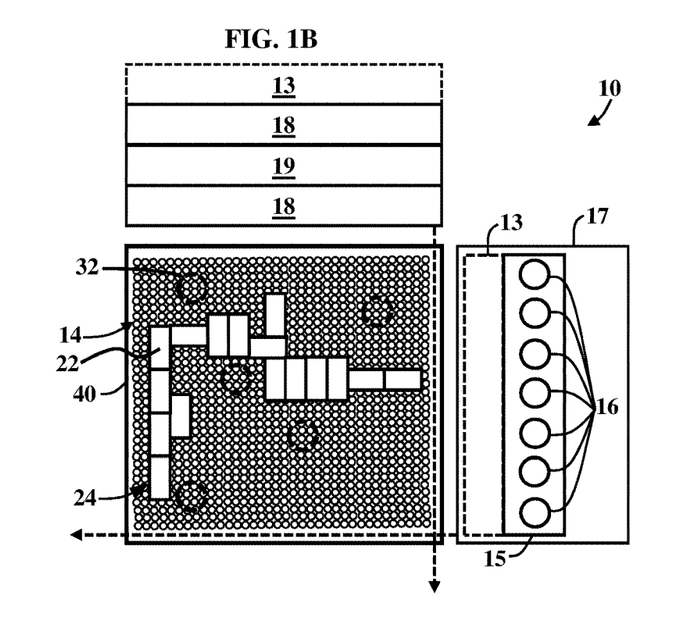
FIG. 1B is a schematic top view diagram of a 3D printer, according to an example herein.
Figure 1C:
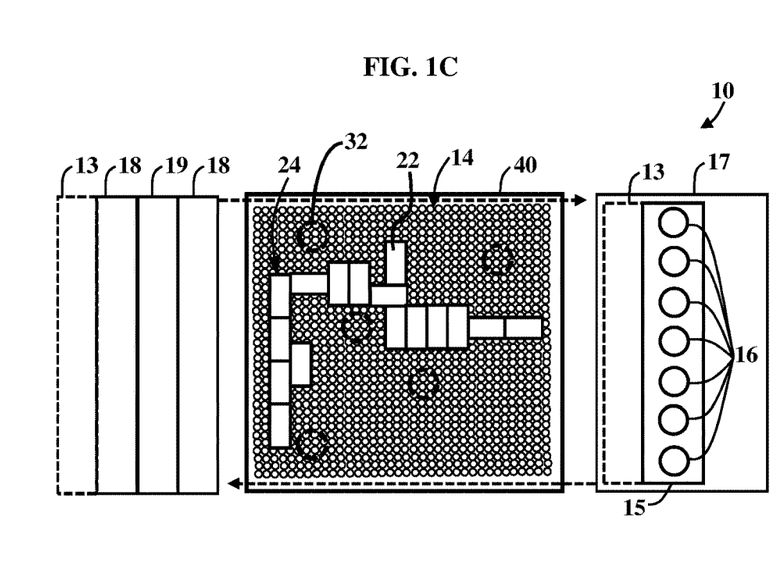
FIG. 1C is a schematic top view diagram of a 3D printer, according to another example herein.

FIG. 1A illustrates a 3D printing device 10 comprising a substrate 12 to receive powder material 14. A nozzle 16 is set to deliver agents 20 to the powder material 14. The agents 20 may include both fusing agents as well as detailing agents. The temperature of the powder material 14 is controlled so that it is neither too low nor too high. A warming lamp 18 is set to deliver energy to the agents 20 to cause thermal excitation of the powder material 14 for fusing into solid parts 22 creating a fused structure 24. While FIG. 1A illustrates only one nozzle 16 and one warming lamp 18, the 3D printing device 10 may contain multiple warming lamps 18, a material coater 19, and one or more printer heads 17 containing multiple nozzles 16 arranged in an array 15 as shown in FIG. 1B. The printer head 17 may also contain one or more fusing lamps 13, in one example. In another example, the fusing lamps 13 may be operatively connected to the warming lamps 18 and material coater 19 in addition to, or instead of, on the printer head 17. The printer head 17 moves across and over the bed area 40 containing the powder material 14, and the one or more fusing lamps 13, one or more warming lamps 18, and material coater 19 may move across and over the bed area 40 and powder material 14 in a direction substantially transverse to the direction of movement of the printer head 17, in one example as shown in FIG. 1B. In another example, as shown in FIG. 10, the one or more fusing lamps 13, one or more warming lamps 18, and material coater 19 may move across and over the bed area 40 and powder material 14 in a substantially parallel, and opposite, direction to the movement of the printer head 17. The fused structure 24 is created as the powder material 14 is fused by the resulting energy provided by the warming lamps 18 upon the agents 20, of FIG. 1A, delivered by the nozzles 16 onto the powder material 14 in a predetermined pattern. Powder control temperature regions 32, as described in greater detail below, are selectively positioned in one or more locations in the powder material 14 adjacent to the solid parts 22.

Figure 2:
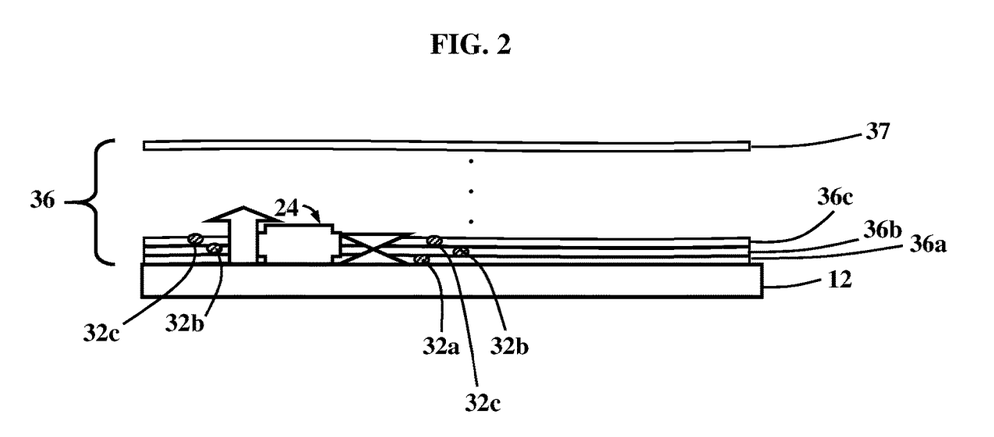
FIG. 2 is a schematic diagram illustrating multiple layers used to construct a build by a 3D printer, according to an example herein.

As further shown in FIG. 1A, camera 26 is set to capture thermal images of the solid parts 22. In some examples, the camera 26 may be a thermal Heimann® or FLIR® Lepton® camera. A Heimann®/FLIR® camera typically has a resolution of 30×30 pixels while a FLIR™ Lepton typically has a resolution of 80×80 pixels. Both types of cameras may be used to capture a bed area 40 of approximately 10 inches×8 inches. The camera 26 provides real-time detection of areas of interest in each layer 36 of powder material 14 and within each pass of the nozzle 16 and agents 20 over the powder material 14 within each layer 36 in order to apply corrective action in terms of the amount of energy dispersed by the warming lamp 18. FIG. 2, with reference to FIGS. 1A and 1B, depicts the layer 36 as multiple layers 36a, 36b, 36c, . . . 37. Each of the layers 36a, 36b, 36c, . . . 37 contains powder material 14 which can be selectively fused to construct a part structure 24 and create the overall build. Accordingly, the solid parts 22 and fused structure 24 may extend through any of, or each of, the multiple layers 36a, 36b, 36c, . . . 37.

Again with reference to FIG. 1A, a processor 28 is operatively connected to the warming lamp 18 and the nozzle 16. The processor 28, which may include a special purpose processor, application specific integrated circuit (ASIC) processor, or any type of processing unit that is suitable for use in a 3D printer 10, determines the needed corrective action and utilizes a control unit 27, shown in FIG. 4 and further described below, to control the energy output of the warming lamp 18. The 3D printer 10 also includes a memory 30, shown in FIG. 1A, comprising instructions executable by the processor 28 to detect the solid parts 22 comprising specified shape characteristics based on the thermal images taken by the camera 26, wherein the specified shape characteristics comprise any of a predetermined area-to-perimeter ratio of a selected part and a visual clarity of the selected part in the thermal images. A user interface 31 may also be provided on the printer 10 to allow a user/operator to input instructions and receive status/operational information of the printer 10 and/or printing process.

The instructions cause the processor 28 to establish locations of powder control temperature regions 32 adjacent to, but properly spaced apart from, the solid parts 22 in the powder material 14 based on the specified shape characteristics, wherein the locations of the powder control temperature regions 32 comprise a combination of a maximum distance away from the part that generates a thermal radiation content above a predetermined threshold and a minimum distance away from the part that increases a printable build area of the fused structure 24. The instructions cause the processor 28 to calibrate the warming lamp 18 based on the temperature readings from the powder control temperature regions 32. The calibration of the warming lamp 18 occurs through a feedback-driven process of the temperature measurements taken of the powder control regions 32, such that the feedback occurs in real-time during the printing process; i.e., at run time. The powder control temperature regions 32 allow for the establishment of temperature readings of the powder material 14 in order to determine the correspondingly proper output energy, which the warming lamp 18 should have. The proper output energy of the warming lamp 18 causes the build to occur with minimal defects, if any.

The instructions cause the processor 28 to analyze simulated representation images; i.e., printer command language (PCL) images, of the fused structure 24, select potential parts 34 comprising the specified shape characteristics based on the analysis of the simulated representation images of the fused structure 24, perform a comparison of the potential parts 34 selected from the simulated representation images of the fused structure 24 with the detected solid parts 22 comprising the specified shape characteristics based on the thermal images, and establish the locations of the powder control temperature regions 32 based on the comparison. The location of the powder control regions 32 are not necessarily influenced by the areas of the powder material 14 that are printed into parts 22. In order for the processor 28 to receive accurate thermal images from the camera 26, the selected solid parts 34 have a minimum area, which is determined on a case-by-case basis, thereby providing accurate thermal readings.

The substrate 12 is set to receive a plurality of layers 36a, 36b, 36c, . . . 37 of powder material 14, wherein the instructions cause the processor 28 to establish locations of powder control temperature regions 32 in each layer 36 of powder material 14. The instructions cause the processor 28 to recalibrate the warming lamp 18 for each fusing process in each subsequent layer 36b, 36c . . . 37. A sensor 38 is set to take thermal measurements of each of the powder material 14 and the solid parts 22. The sensor 38 may be moveable, or multiple embedded sensors may be used to take thermal measurements of various areas of the powder material 14 of various solid parts 22. The instructions cause the processor 28 to use the thermal measurements to establish the locations of powder control temperature regions 32. The instructions cause the processor 28 to control delivery by the nozzle 16 of the agents 20 to the powder material 14 based on the locations of the powder control temperature regions 32 and the selected parts 34 relative to the powder control temperature regions 32.

Figure 3:
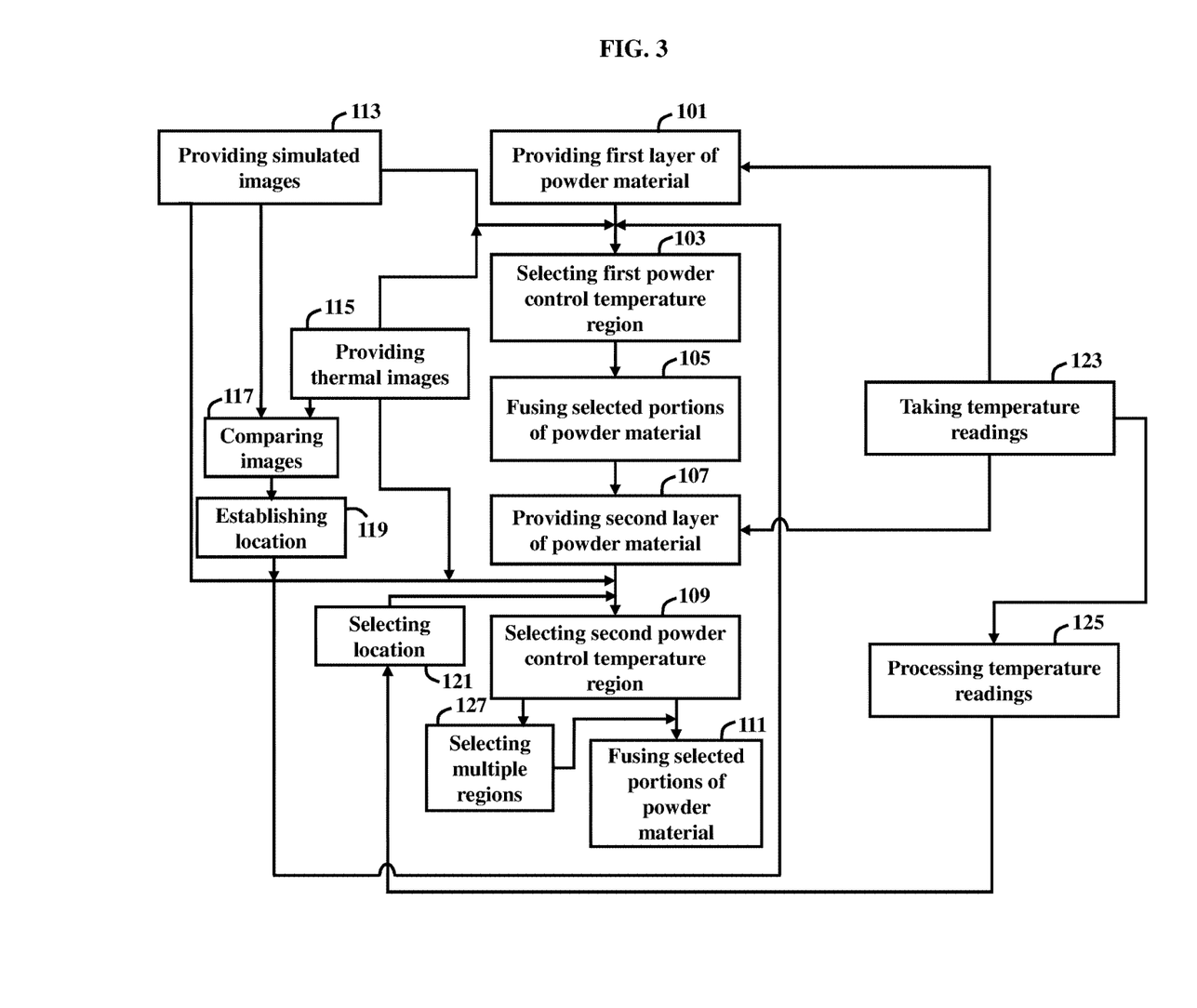
FIG. 3 is a flowchart illustrating a method, according to an example herein.

FIG. 3, with reference to FIGS. 1A through 2, is a flowchart illustrating a method of performing a 3D printing process by a device such as the 3D printer 10. In this regard, the processor 28 of the 3D printer 10 may be programmed with instructions, and saved in memory 30, to perform the various processes described with reference to FIG. 3. Block 101 describes providing a first layer 36a of 3D printing powder material 14 on a substrate 12. Block 103 describes selecting a first powder control temperature region 32a in the first layer 36a. Block 105 describes fusing selected portions of the powder material 14 in the first layer 36a to create solid parts 22. Block 107 describes providing a second layer 36b of powder material 14 on the solid parts 22. Block 109 describes selecting a second powder control temperature region 32b in the second layer 36b based on a shape and the thermal measurements of the solid parts 22. Block 111 describes fusing selected portions of the powder material 14 in the second layer 36b based on the second powder control temperature region 32b. The first and second powder control temperature regions 32a, 32b are located in areas of unfused powder material 14 adjacent to, but properly spaced apart from, the solid parts 22.

Block 113 describes providing simulated images of the solid parts 22. The simulated images; i.e., PCL images may provide drop counts per layer/pass. Block 115 describes providing thermal images of the solid parts 22. The thermal images may provide information for the current layer to act upon. Block 117 describes comparing the simulated images to the thermal images. The PCL images region of interests are converted into the thermal camera pixel measurement regions of interest (ROI) based on an ROI transformation defined by an image calibration pattern. The measurement ROIs are defined before the build from the pre-processed PCL image data. This enables rapid analysis of thermal image data. Block 119 describes establishing a location of the powder control temperature region 32b in the second layer 36b based on the comparison of the simulated images to the thermal images. Valid powder control region locations can be initially determined by a pre-build processing of the PCL images for each layer by evaluating the separation from the part PCL images in X and Y directions. The required separation in X may be greater than the separation in Y due to the transfer of heated powder from fused regions in the X direction during the spreading process. The PCL images are compared layer to layer to define the required Z separation between a particular powder control region and the parts below.

Block 121 describes selecting a location of the powder control temperature region 32b in the second layer 36b by combining a maximum distance away from a selected part 34 that generates heat above a predetermined threshold and a minimum distance away from the selected part 34 that increases a printable build area of the fused structure 24.

Block 123 describes taking temperature readings of the powder material 14 in the first and second layers 36a, 36b based on the thermal camera pixel measurement ROIs. Block 125 describes processing the temperatures readings to select a location of the powder control temperature region 32c in a third layer 36c. Block 127 describes selecting multiple powder control temperature regions 32b in the second layer 36b. The powder regions with adequate XYZ separation are segmented into ROIs based on their size category, and each is associated with additional thermally relevant parameters so that the measured temperature can be compensated for thermal variation due to position from edges of the build region, distance and size of adjacent parts in X, Y, and Z directions. The measurement from each ROI region are weighed based on their quality/confidence, compensations are applied to define a reported temperature for each ROI. The results from multiple ROIs are evaluated to identify outliers that may have special causes, and a weighted average control temperature is used for powder warming temperature control.

Figure 4:
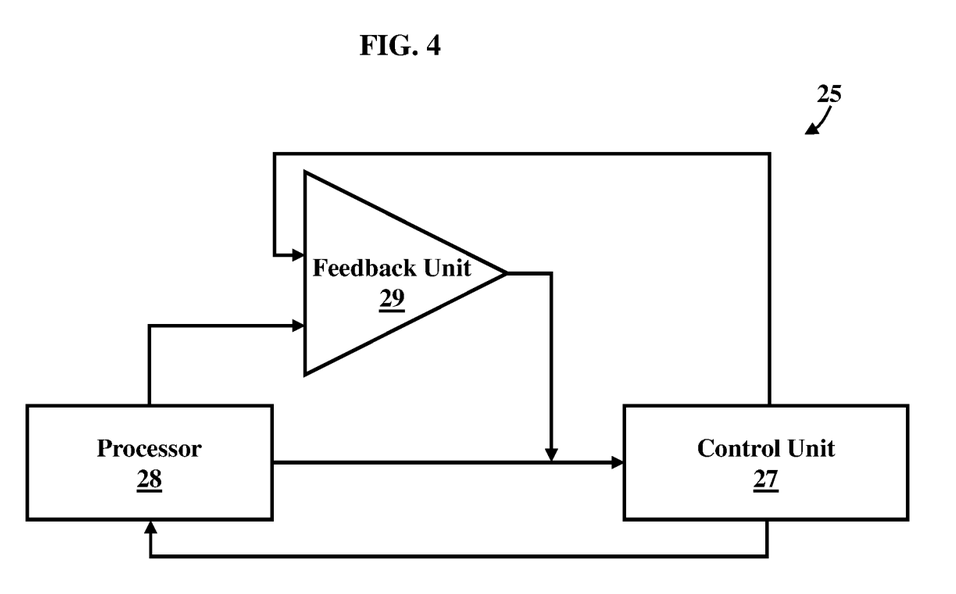
FIG. 4 illustrates a system block diagram, according to an example herein.

FIG. 4, with reference to FIGS. 1A through 3, illustrates a system 25 comprising a processor 28 to detect solid parts 22 comprising specified shape and thermal characteristics, wherein the solid parts 22 are generated by a 3D printing device 10, and wherein the solid parts 22 comprise powder material 14 fused on a layer by layer basis. A control unit 27 is set to select at least one powder control temperature region 32a, 32b, . . . in each layer 36a, 36b, 36c, . . . 37 of powder material 14, wherein the at least one powder control temperature region 32a, 32b, . . . is located in unfused powder material 14 adjacent to, but properly spaced apart from, the solid parts 22, and wherein the at least one powder control temperature region 32a, 32b, . . . is selected based on characteristics of the shape of a build area and thermal imaging associated with any of a structural formation of the solid parts 22 adjacent to the at least one powder control temperature region 32a, 32b, . . . and an amount of thermal energy radiated by the solid parts 22 adjacent to the at least one powder control temperature region 32a, 32b, . . . . A feedback unit 29 is set to modify an amount of thermal energy to cause fusing of the powder material 14 on each subsequent layer 36b, 36c, . . . 37 in the solid parts 22 based on locations of the at least one powder control temperature region 32a, 32b, . . . .

The locations of the at least one powder control temperature region 32a, 32b, . . . comprises a combination of a maximum distance away from a part 34 that generates a thermal radiation content above a predetermined threshold and a minimum distance away from the part 34 that increases a printable build area of the fused structure 24. The control unit 27 is set to receive instructions to select the at least one powder control temperature region 32a, 32b, . . . in each layer 36a, 36b, 36c, . . . 37 of powder material 14 during a 3D printing process. The process of choosing the location of the powder control temperature region 32a, 32b, . . . can be a completely automated process whereby the processor 28 makes the location determination, or a semi-automated process such that an operator of the printer 10 may be asked by the feedback unit 29 to select one of the recommended locations of the powder control temperature region 32a, 32b, . . . , and the operator then inputs the selected location in the control unit 27 via the user interface 31. Real-time control via the control unit 27 and feedback via the feedback unit 29 may occur using any of the thermal sensor 38 and the thermal images that provide timely temperature readings of the powder material 14 and of the parts 22, 34 since temperature is a proxy for so many properties that effect part yield; for example, mechanical strength, part density, dimensional accuracy, roughness, etc. Moreover, the location of the powder control regions 32a, 32b, . . . are not known until the build structure 24 is determined via the simulated images. The PCL images encode the shape of the cross-section for a selected part 22 for a given layer; e.g., layer 36b, in one example. The cross-section may change from layer-to-layer and part-to-part. Accordingly, the location(s) to use for the temperature readings for the powder material 14 and parts 22 is a dynamic issue, whereby measuring the temperature of the powder material 14 that is too close to a large part 34 risks capturing thermal bleed from the part 34, and measuring the temperature of the powder material 14 that is too far away from the part 34 risks underutilizing the overall build volume. As such, the feedback unit 29 provides a solution to this dynamic issue by permitting binding of the subsequent layers 36b, 36c, . . . 37, which permits the layers 36b, 36c, . . . 37 to undergo further transformations to achieve desired part yield outcomes. Accordingly, the powder control regions 32a, 32b are based on the thermal feedback and the shape characteristics of the parts 22, 34 at layers 36a, 36b, 36c, . . . 37, respectively. The selection of the powder control temperature regions 32a, 32b, 32c, . . . to use for the temperature readings by the sensor 38, multiple sensors, embedded sensors, or thermal images of a given part 22 provide the feedback unit 29 with the requisite information to instruct the control unit 27 to provide proper guidance of the nozzle 16 to disperse the agents 20, to provide the warming lamp 18 with instructions for providing the proper amount of energy to heat the agents 20, and to heat the substrate 12 in order to raise the temperature of the powder material 14 to just below a melting temperature prior to application of the agents 20.

Figure 5:
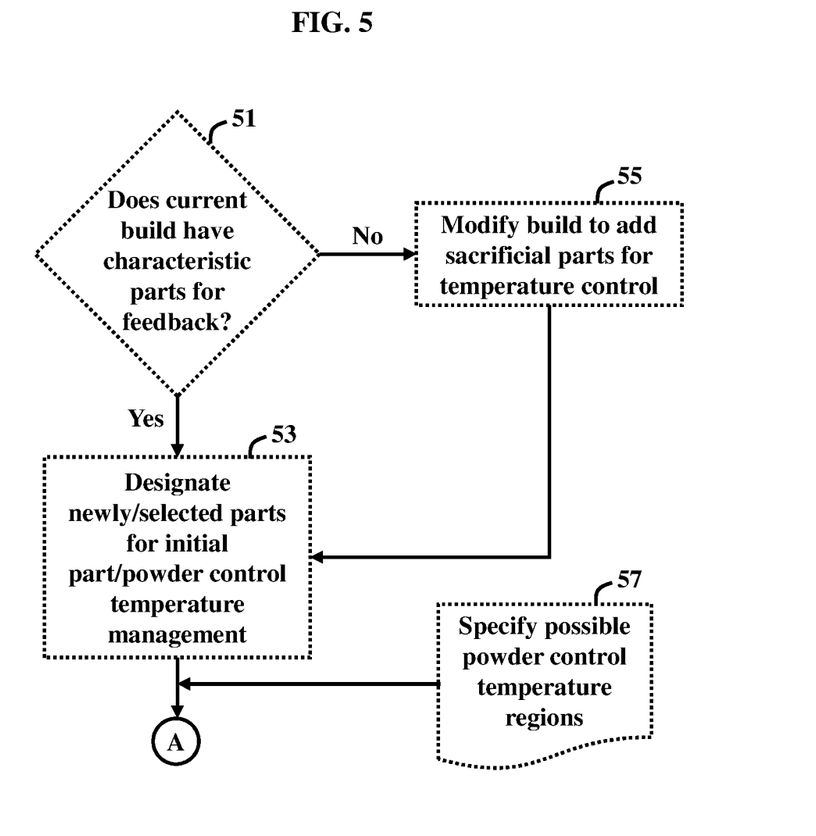
FIG. 5 is a flowchart illustrating a control and feedback method, according to an example herein.

FIG. 5, with reference to FIGS. 1A through 4, depicts an example control and feedback process performed by the system 25 in conjunction with the 3D printer 10. In this regard, the processor 28 of the system 25 and 3D printer 10 may be programmed with instructions, and saved in memory 30, to perform the various processes described with reference to FIG. 5. In FIG. 5, the dotted line blocks 51-57 represent the identification of characteristic parts 34 based on previously built parts before a build process has started. The remaining solid line blocks 59-85 in FIG. 5 represent the real-time feedback and control performed by system 25 after the build has started. In accordance with the examples herein, the processor 28 identifies parts 22 that have a higher area-to-perimeter ratio since these tend to have a higher temperature and are more likely to get hotter during a build than parts with a lower area-to-perimeter ratio. The processor 28 may be programmed with other heuristics and thermal design rules that may be used to identify the parts 22 used for thermal control; i.e., used to identify the powder control temperature regions 32. In one example, if a particular build does not have suitable parts to use as a guide to locate a proper powder control temperature region 32, then additional sacrificial parts 23 can be introduced into the build to provide control and feedback in the system 25. This is depicted in blocks 51-57 in FIG. 5.

In block 51, it is determined whether the current build has characteristic parts 22 to provide feedback to help in determining a suitable location for a powder control temperature region 32. If the current build has characteristic parts 22, according to block 51, then the process moves to block 53, which designates a newly selected part(s) 22a for initial part/powder control temperature management for the build. If the current build does not have characteristic parts, according to block 51, then the process moves to block 55 where the build is modified by adding sacrificial parts 23 to provide temperature control, based on predetermined thermal design rules programmed into the processor 28. These sacrificial parts 23 are then designed as the newly selected parts for the initial part/powder control temperature management for the build. Block 57 provides for a semi-automated example, as described above, whereby an operator of the printer 10 may specify possible regions where the powder control temperature regions 32 may be located.

Figure 6A:
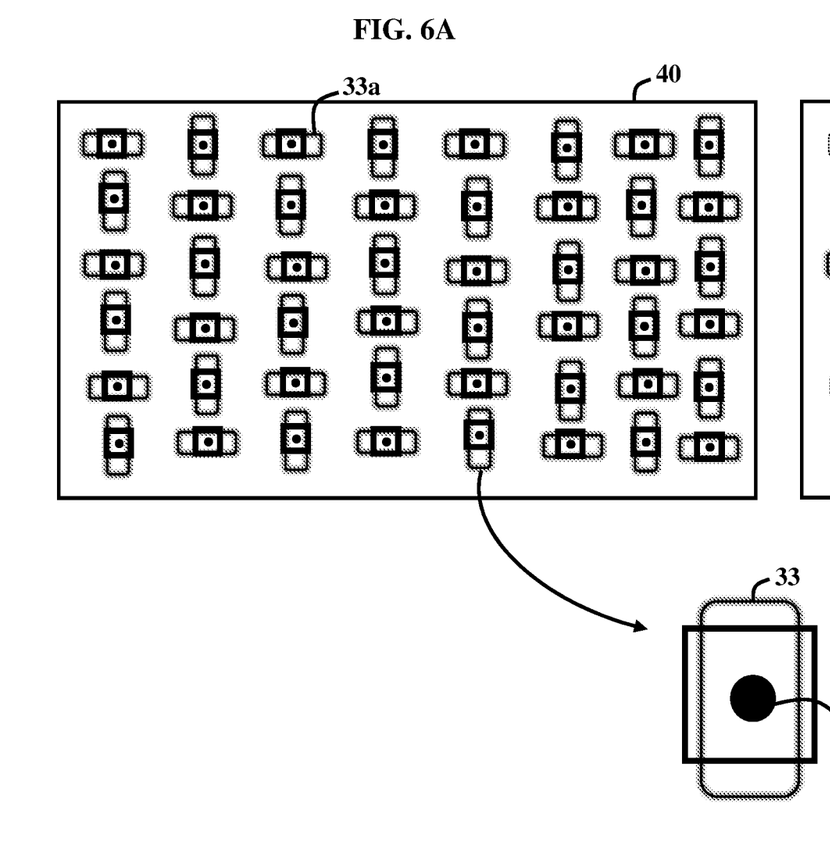
FIG. 6A is a schematic diagram illustrating blob detection, according to an example herein.
Figure 6B:
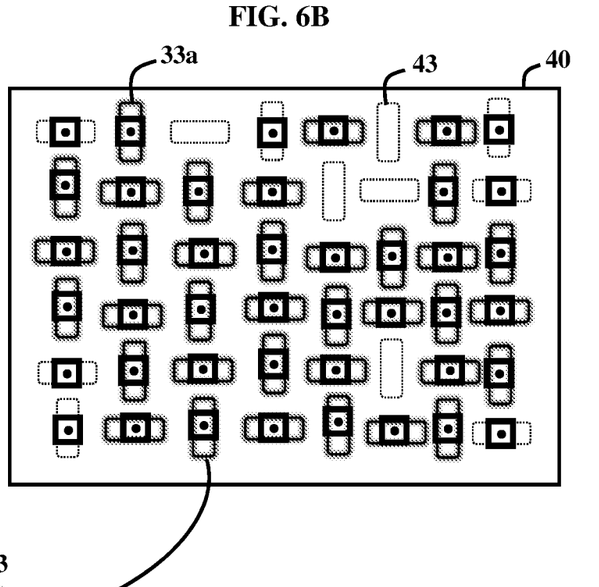
FIG. 6B is a schematic diagram illustrating another method of blob detection, according to an example herein.

Next, the process moves to block 59 where it is determined whether there is another layer; e.g., layer 36*b*, of powder material 14 to build. If there is no additional layer 36*b* to build, according to block 59, then the process stops in block 61 and no additional powder control temperature regions 32*b*, 32*c*, . . . are necessary to be established. If there are additional layers 36*b*, 36*c*, . . . 37 to build, according to block 59, then the process moves to block 62 where the thermal images are acquired by the camera 26 for the current layer or nozzle 16 and warming lamp 18 to pass over the substrate 12. In order to provide control and feedback to the system 25, the processor 28 uses blob detection on the images generated from the thermal camera 26. In context herein, "blob" refers to an object or part 22 that is built and detected by the camera 26 during the thermal imaging process. Due to the resolution provided by the camera 26, the object/part 22 appears as a "blob" in the thermal images. If the object/part 22 detected by the camera 26 is perfectly defined and the inter-part spacing on the bed 40 is sufficiently large, then each blob 33 can be detected separately from any other blob 33, as depicted in FIG. 6A. On the other hand, if the inter-part spacing is not sufficiently large on the bed 40, then blobs at a lower temperature may go undetected by the thermal camera 26 as depicted by the "missing" objects 43 in FIG. 6B denoted by dotted/phantom lines. In such a situation, an operator of the printer 10 may input instructions to the processor 28 using the user interface 31 to provide further aid in detecting objects. As described further below, the centroids 35 of each blob 33 that is perfectly defined can be determined using mathematical techniques. Moreover, the centroids 35 of each blob 33 that is not perfectly defined can be estimated by an operator of the printer 10.

Again with reference to FIG. 5, prior to the build, printer command language (PCL) files are created in block 60, which may be simulated images of what the build and its sub-components should properly look like. In block 63 a blob/contour detection process is run on the PCL files to identify characteristic parts 22*a*. Block 64 provides that the perimeter of a bed 40 is identified for analysis. Thereafter, in block 65, blob detection is run on both the thermal image acquired in block 62 and the PCL images for the required perimeter of the bed 40 identified in block 64. The system 25 complements the thermal image blob detection with the PCL blob detection to rule out distortions and tilt of the camera 26 by performing, using the processor 28, affine and non-affine transformations on the thermal image. The pre-programmed and pre-created PCL file images are different from the thermal images taken by the camera 26, and the shape comparison provided by the two images in block 65 permits the system 25 to provide valuable feedback.

In block 67, the centroids 35 of the blobs 33 are identified where the blobs 33*a* that have the highest area-to-perimeter ratio with the resolution parameters of the camera 26 are selected. The blobs 33*a* that are detectable in both the PCL and thermal images is selected in block 69. In block 71 it is determined whether the selected blob 33*a* from block 69 is at the desired temperature. If the selected blob 33*a* is not at the desired temperature, according to block 71, then the process moves to block 73 which maps the location of the selected blob 33*a* to the corresponding one on the PCL image and extract the inks/agents 20, including the fusing agents used to create the selected blob 33*a*. In block 75, any necessary remedial action is performed for the agents 20 including the detailing agent (DA) or fusing agent (FA) or any other agent or a combination thereof. In a build, the various layers 36*a*, 36*b*, 36*c*, . . . 37 may have different agents 20 acting on them. Accordingly, the PCL blob detection provides information on the agents 20 used in a particular pass/layer, which is provided in the system 25 for feedback and control, using feedback unit 29 and control unit 27, respectively. The PCL images and the thermal images are used to identify areas where cooling/detailing agents should be applied to achieve the target temperature based on a set of design rules or a lookup table and the processor 28 issues firmware triggers to increase/decrease the drop counts of agent 20 in the targeted region. In block 77 the FA/DA remedial action compensation is applied for a desired temperature by triggering firmware programmed into the processor 28 for the corresponding nozzle 16 used for the next layer; e.g., layer 36*b*. For example, based on the current layer 36*a* and the target temperature, corrective action may occur using a predetermined mapping table by triggering suitable firmware parameters stored in memory 30 and executed by processor 28. In one example, for robustness, the processor 28 considers multiple pixels, including the centroid 35, to estimate the temperature of the detected blob 33. Once the blobs 33 are known, the selected powder control temperature regions 32 are identified for conformance to a predetermined target temperature, which is generally provided in blocks 62-77 in FIG. 5.

Again with reference to block 71, if the selected blob 33*a* from block 69 is at the desired temperature, according to block 71, then the process moves to block 79 where it is determined whether all the blobs 33 have been constructed. Block 77 outputs into the decision block 79 as does block 71. If all the blobs 33 are not constructed or done, according to block 79, then the process reverts back to block 69 for selection of a suitable blob 33*a* that is detectable in both the PCL and thermal images. If all the blobs 33 are constructed/done, according to block 79, then the process moves to block 81 where a convex hull mathematical calculation may be computed from the blob centroids 35. Next, block 83 provides that a new powder control region 32 is identified based on the maximal distance from points on the convex hull. Thereafter, block 85 provides that powder control temperature regions 32 are selected based on the ranking of the identified regions of possible locations for the powder control regions 32. As such, in blocks 81-85, the powder control region(s) 32 is/are identified from the thermal image blobs 33 by selecting the farthest distance available, within the perimeter of the bed 40 and the printed area perimeter, by finding the convex hull from the set of blobs 33 identified above/below the target temperature and then selecting the powder control region(s) 32 which is farthest from the points on the hull. If an operator of the printer 10 prefers or inputs a constraint into the system 25 via the user interface 31, that only certain regions in the powder material 14 are to be used for the powder control regions 32, then those areas are considered preferred locations for the powder control regions 32 and the system 25 defaults to the operator's selection. The process then continues to loop back to block 59 to determine whether there is another layer to build; e.g., layer 36*c*.

The examples provided herein dynamically detect the location(s) of the powder control region(s) 32 using the detected regions of interest from block 63 so that local temperature non-uniformities and thermal bleeding do not affect the powder temperature measurement. Moreover, because the performance of the warming lamp 18 can vary over time, the system 25 may control the pulse width modulation (PWM) of the warming lamp 18 using parts 34 that have the required minimum resolvable characteristics or features. In this regard, by using the temperature readings for the fusing agent region from characteristic parts 22a, the warming lamp 18 may be calibrated using parts 34 selected from the build or sacrificial parts 23 instrumented into an existing build by software/firmware.

In this regard, various examples herein may include both hardware and software elements. The examples that are implemented in software include but are not limited to, firmware, resident software, microcode, etc. Other examples may comprise a computer program product configured to include a pre-configured set of instructions, which when performed, may result in actions as stated in conjunction with the methods described above. In an example, the pre-configured set of instructions may be stored on a tangible non-transitory computer readable medium or a program storage device containing software code.

Figure 7:
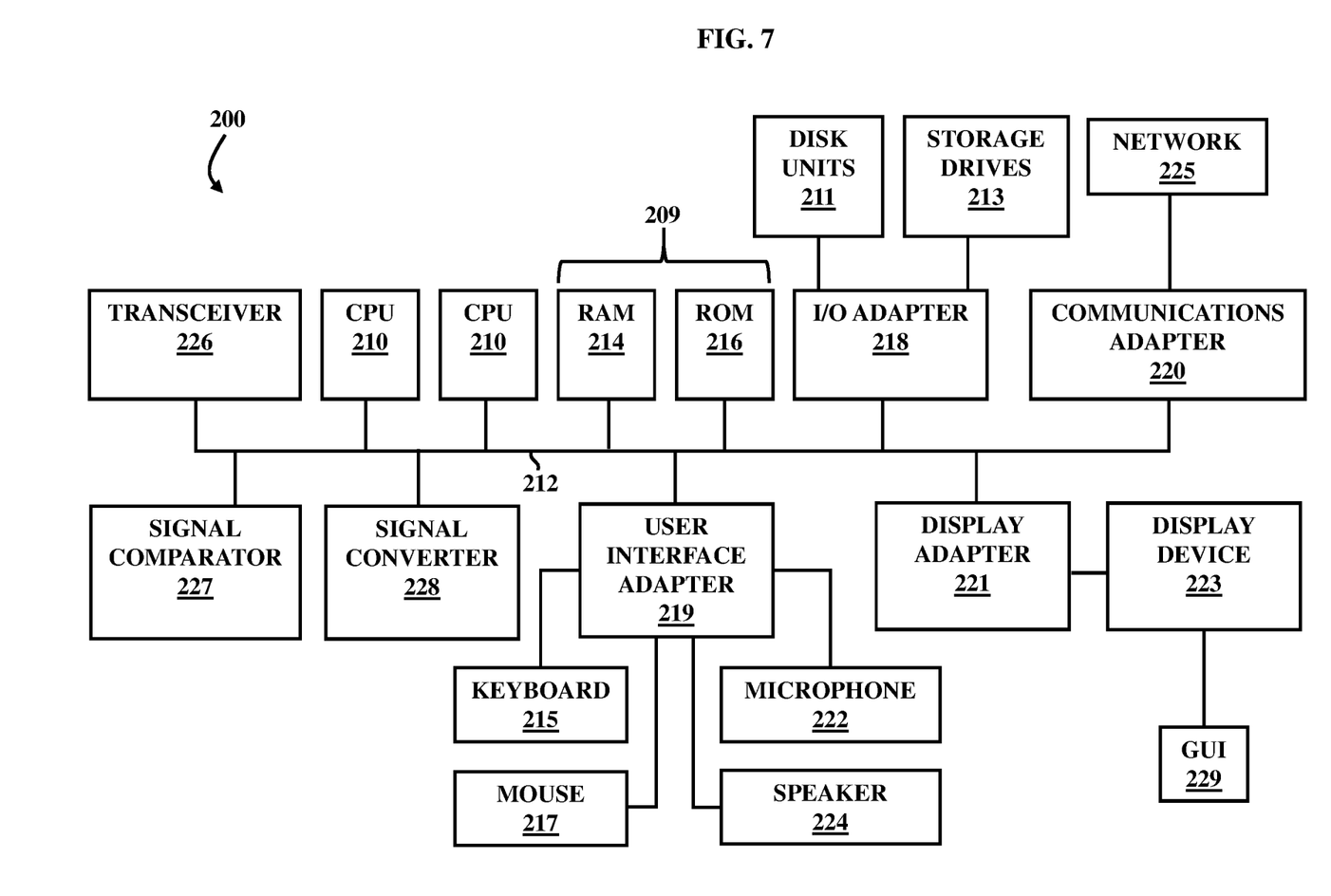
FIG. 7 is a block diagram illustrating a computer system, according to an example herein.

A representative hardware environment for practicing the examples herein is depicted in FIG. 7, with reference to FIGS. 1A through 6B. This block diagram illustrates a hardware configuration of an information handling/computer system 200 according to an example herein. The system 200 comprises one or more processors or central processing units (CPU) 210, which may communicate with processor 28 of printer 10, or in an alternative example, the CPU may be configured as processor 28 of printer 10. The CPUs 210 are interconnected via system bus 212 to at least one memory device 209 such as a RAM 214 and a ROM 216. In one example, the at least one memory device 209 may be configured as the memory device 30, or one of several memory elements of the memory device 30 of printer 10. The at least one memory device 209 may include local memory employed during actual execution of the program code, bulk storage, and cache memories which provide temporary storage of at least some program code in order to reduce the number of times code must be retrieved from bulk storage during execution.

An I/O adapter 218 may connect to peripheral devices, such as disk units 211 and storage drives 213, or other program storage devices that are readable by the system 200. The system 200 includes a user interface adapter 219 that may connect the bus 212 to a keyboard 215, mouse 217, speaker 224, microphone 222, and/or other user interface devices such as a touch screen device, which may be configured as the user interface 31 of printer 10, to gather user input and display information from/to a user. Additionally, a communication adapter 220 connects the bus 212 to a data processing network 225, and a display adapter 221 connects the bus 212 to a display device 223, which may provide a graphical user interface (GUI) 229 for a user to interact with. Further, a transceiver 226, a signal comparator 227, and a signal converter 228 may be connected to the bus 212 for processing, transmission, receipt, comparison, and conversion of electric or electronic signals, respectively.

According to the techniques provided by the examples herein, 3D part yield is improved by the timely detection of defect(s) on the parts 22, 34 thereby allowing an operator of the printer 10 to take appropriate action to ameliorate the defect(s). The various examples described herein provide a technique for instrumenting a build so that there are characteristic parts 22a, if not already present, by using thermal design rules for modifying a build for particular size and spacing requirements. The automated method of detecting regions of interest that could be a suitable location for a powder control temperature region 32 requires constant monitoring, and the system 25 provides both feedback and control to accomplish this in conjunction with the blob detection technique that isolates the region of the bed 40; e.g., powder material 14 on the substrate 12, where the actual parts 22 are using the contour detection from the PCL file images.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A three-dimensional printing device comprising:
a substrate to receive powder material;
a nozzle to deliver fusing agents to the powder material;
a warming lamp to deliver energy to the fusing agents to cause thermal excitation of the powder material for fusing into solid parts creating a fused structure;
a camera to capture thermal images of the solid parts;
a processor operatively connected to the warming lamp and the nozzle; and
a memory comprising instructions executable by the processor to:
  detect the solid parts comprising specified shape characteristics based on the thermal images, wherein the specified shape characteristics comprise any of a predetermined area-to-perimeter ratio of a selected part and a visual clarity of the selected part in the thermal images;
  establish locations of powder control temperature regions adjacent to the solid parts in the powder material based on the specified shape characteristics, wherein the locations of the powder control temperature regions comprise a combination of a maximum distance away from the part that generates a thermal radiation content above a predetermined threshold and a minimum distance away from the part that increases a printable build area of the fused structure; and
  calibrate the warming lamp based on temperature readings from the powder control temperature regions,
wherein the instructions further cause the processor to:
  analyze simulated representation images of the fused structure;
  select potential parts comprising the specified shape characteristics based on the analysis of the simulated representation images of the fused structure;
  perform a comparison of the potential parts selected from the simulated representation images of the fused structure with the detected solid parts comprising the specified shape characteristics based on the thermal images; and
  establish the locations of the powder control temperature regions based on the comparison.

2. The three-dimensional printing device of claim 1, wherein the substrate is set to receive a plurality of layers of powder material, and wherein the instructions cause the processor to establish locations of powder control temperature regions in each layer of powder material.

3. The three-dimensional printing device of claim 1, wherein the instructions cause the processor to recalibrate the warming lamp for each fusing process in each subsequent layer.

4. The three-dimensional printing device of claim 1, comprising a sensor to take thermal measurements of each of the powder material and the solid parts.

5. The three-dimensional printing device of claim 4, wherein the instructions cause the processor to use the thermal measurements to establish the locations of powder control temperature regions.

6. The three-dimensional printing device of claim 1, wherein the instructions cause the processor to control delivery by the nozzle of the fusing agents to the powder material based on the locations of the powder control temperature regions and selected parts relative to the powder control temperature regions.

7. A three-dimensional printing device comprising:
a nozzle to deliver fusing agents to powder material;
a lamp to deliver energy to the fusing agents to cause thermal excitation of the powder material for fusing into solid parts creating a fused structure;
a camera to capture thermal images of the solid parts; and
a processor operatively connected to the lamp and the nozzle, wherein the processor is configured to:
detect the solid parts comprising specified shape characteristics based on the thermal images, wherein the specified shape characteristics comprise any of a predetermined area-to-perimeter ratio of a selected part and a visual clarity of the selected part in the thermal images;
establish locations of powder control temperature regions adjacent to the solid parts based on the specified shape characteristics, wherein the locations of the powder control temperature regions comprise a maximum distance away from the part that generates a thermal radiation content above a predetermined threshold;
analyze simulated representation images of the fused structure;
select potential parts comprising the specified shape characteristics based on the analysis of the simulated representation images;
perform a comparison of the potential parts selected from the simulated representation images with the detected solid parts comprising the specified shape characteristics based on the thermal images; and
establish the locations of the powder control temperature regions based on the comparison.

8. The three-dimensional printing device of claim 7, comprising a substrate to receive a plurality of layers of powder material, wherein the processor is configured to establish locations of powder control temperature regions in each layer of powder material.

9. The three-dimensional printing device of claim 7, wherein the processor is configured to calibrate the lamp based on temperature readings from the powder control temperature regions.

10. The three-dimensional printing device of claim 9, wherein the processor is configured to recalibrate the lamp for each fusing process in each subsequent layer.

11. The three-dimensional printing device of claim 7, comprising a sensor to take thermal measurements of each of the powder material and the solid parts.

12. The three-dimensional printing device of claim 11, wherein the processor is configured to use the thermal measurements to establish the locations of powder control temperature regions.

13. The three-dimensional printing device of claim 7, wherein the processor is configured to control delivery by the nozzle of the fusing agents to the powder material based on the locations of the powder control temperature regions and selected parts relative to the powder control temperature regions.

14. The three-dimensional printing device of claim 7, wherein the locations of the powder control temperature regions comprise a minimum distance away from the part that increases a printable build area of the fused structure.

15. The three-dimensional printing device of claim 14, wherein the locations of the powder control temperature regions comprise a combination of the maximum distance away from the part that generates a thermal radiation content above a predetermined threshold and the minimum distance away from the part that increases a printable build area of the fused structure.

16. The three-dimensional printing device of claim 7, wherein the lamp comprises one or more lamps.

17. A three-dimensional printing device comprising:
a substrate to receive fusing agents and powder material;
a lamp to deliver energy to the fusing agents to cause thermal excitation of the powder material for fusing into solid parts creating a fused structure;
a camera to capture thermal images of the solid parts; and
a processor configured to:
detect the solid parts comprising specified shape characteristics based on the thermal images, wherein the specified shape characteristics comprise any of a predetermined area-to-perimeter ratio of a selected part and a visual clarity of the selected part in the thermal images;
establish locations of powder control temperature regions adjacent to the solid parts based on the specified shape characteristics, wherein the locations of the powder control temperature regions comprise a minimum distance away from the part that increases a printable build area of the fused structure;
analyze simulated representation images of the fused structure; select potential parts comprising the specified shape characteristics based on the analysis of the simulated representation images;
perform a comparison of the potential parts selected from the simulated representation images with the detected solid parts comprising the specified shape characteristics based on the thermal images; and
establish the locations of the powder control temperature regions based on the comparison.

18. The three-dimensional printing device of claim 17, wherein the processor is configured to calibrate the lamp based on temperature readings from the powder control temperature regions.

19. The three-dimensional printing device of claim 17, wherein the locations of the powder control temperature regions comprise a maximum distance away from the part that generates a thermal radiation content above a predetermined threshold.

20. The three-dimensional printing device of claim 18, wherein the locations of the powder control temperature regions comprise a combination of the maximum distance away from the part that generates a thermal radiation content above a predetermined threshold and the minimum distance away from the part that increases a printable build area of the fused structure.

* * * * *